(12) United States Patent
Zhao et al.

(10) Patent No.: US 8,941,066 B2
(45) Date of Patent: Jan. 27, 2015

(54) APPARATUS AND METHODS OF INFRARED SIGNAL PROCESSING FOR MOTION DETECTORS

(75) Inventors: Terry Zhao, Shenzhen (CN); Yang Chen, Shenzhen (CN); Hansen Gu, Shenzhen (CN)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 13/291,939

(22) Filed: Nov. 8, 2011

(65) Prior Publication Data

US 2013/0112878 A1    May 9, 2013

(51) Int. Cl.
| | |
|---|---|
| *G01J 5/10* | (2006.01) |
| *G01J 5/02* | (2006.01) |
| *G08B 13/191* | (2006.01) |
| *G01J 5/00* | (2006.01) |
| *G01J 5/22* | (2006.01) |

(52) U.S. Cl.
CPC ............... *G01J 5/026* (2013.01); *G08B 13/191* (2013.01); *G01J 5/0022* (2013.01); *G01J 5/22* (2013.01)
USPC .......................................................... 250/342

(58) Field of Classification Search
CPC ...................................................... G08B 13/191
USPC ............................................................ 250/342
See application file for complete search history.

(56) References Cited

U.S. PATENT DOCUMENTS 5,077,549 A    12/1991    Hershkovitz et al.

OTHER PUBLICATIONS

Great Britain's Intellectual Property Office's Jan. 28, 2013 Search Report under Section 17.
Great Britain's Intellectual Property Office's Jan. 29, 2013 Combined Search and Examination Report under Sections 17 & 18(3).

*Primary Examiner* — Constantine Hannaher
(74) *Attorney, Agent, or Firm* — Husch Blackwell LLP

(57) ABSTRACT

An apparatus and method of processing signals from a passive infrared sensor evaluates energy of received signals. An integration or accumulation process can be used to provide an indicator of signal energy. This indicator can be compared to a predetermined alarm threshold to determine if an alarm indication should be generated.

12 Claims, 5 Drawing Sheets

APPARATUS AND METHODS OF INFRARED SIGNAL PROCESSING FOR MOTION DETECTORS

FIELD

The application pertains to surveillance systems for detecting an intruder in a monitored area of space, and particularly to the signal processing method for detectors. More specifically, it relates to a method for the passive infrared signal recognition processing.

BACKGROUND

Motion detectors using passive infrared (PIR) technology are widely used in the field of security. There are two key components in this type of detector, the one is a Fresnel lens array window which can focus infrared energy produced by a heat source (such as human body) onto a pyroelectric sensor that can convert the changes of infrared energy reaching it into an electrical signal; and the other is a pyroelectric sensor that can convert the infrared energy into an electrical signal. For example, if there is no motion heat source, then the sensor does not output characteristic signal (large amplitude changing randomly), and if there is a person walking in the monitoring area, then the sensor detects the temperature difference between the human body and the background, and output the corresponding characteristic signal.

The signals are amplified, sampled, and processed by hardware circuit and algorithms that determine whether there is an intruder or not, and a corresponding control output can be generated. Thus, in known PIR detectors, the movement of a heat source is sensed. Some detectors, by combining microwave technology with a PIR sensor, attempt to prevent false alarms generated by only using the PIR technology.

A block diagram of a known PIR-type detector is illustrated in FIG. 1. The detector of FIG. 1 includes a PIR sensor module 110, an analog signal processing module 120, a master controlling unit (MCU) module 130. In the detector of FIG. 1 the sensor module outputs electric signals in response to sensing the motion of a human body. The signals are amplified by the analog circuit, and are then processed to make a determination as to the presence of a moving body. An alarm indicating output signal can then be produced and forwarded to a monitoring system.

An alarm indicating output signal is generated if the signal amplitude is higher than the "high-threshold" or is lower than the "low-threshold" and persists for certain time. In response thereto, a PIR alarm indicating output signal is emitted.

The principle of signal processing by using this method is illustrated in FIG. 2. An output signal 210 from a PIR-type sensor varies about a signal baseline 220. A high-threshold 230 and a low-threshold 240 are pre-established.

Relative to the PIR signal as shown, if $\Delta T1 > \Delta T\_TH$ or $\Delta T2 > \Delta T\_TH$ ($\Delta T\_TH$ is the pre-set time threshold), then the PIR detector is triggered, and an alarm indicating signal is emitted.

Disadvantages of the above described method include, missing alarms due to smaller output signals. Such signals might be generated, for example, by an intruder wearing protective clothing, thick clothes, or using an umbrella to block infrared emissions. In other circumstance, it is easy to trigger false alarms for burst signals, such as these signals generated by a sudden shock, a jarring, or a burst hardware inference.

In summary, in known PIR-type detectors, the output signals from PIR-type sensors are indicative of sensed movement of heat sources in the region being monitored. For example, intruder speed, height, weight, dress, behavior, posture, and temperature variations contribute to generating signal waveforms with complex characteristics which result in difficulty in making accurate alarm determinations. This in turn produces undesirable failures to properly emit alarm signals, or the emission of undesirable false alarms.

DETAILED DESCRIPTION

Figure 1:
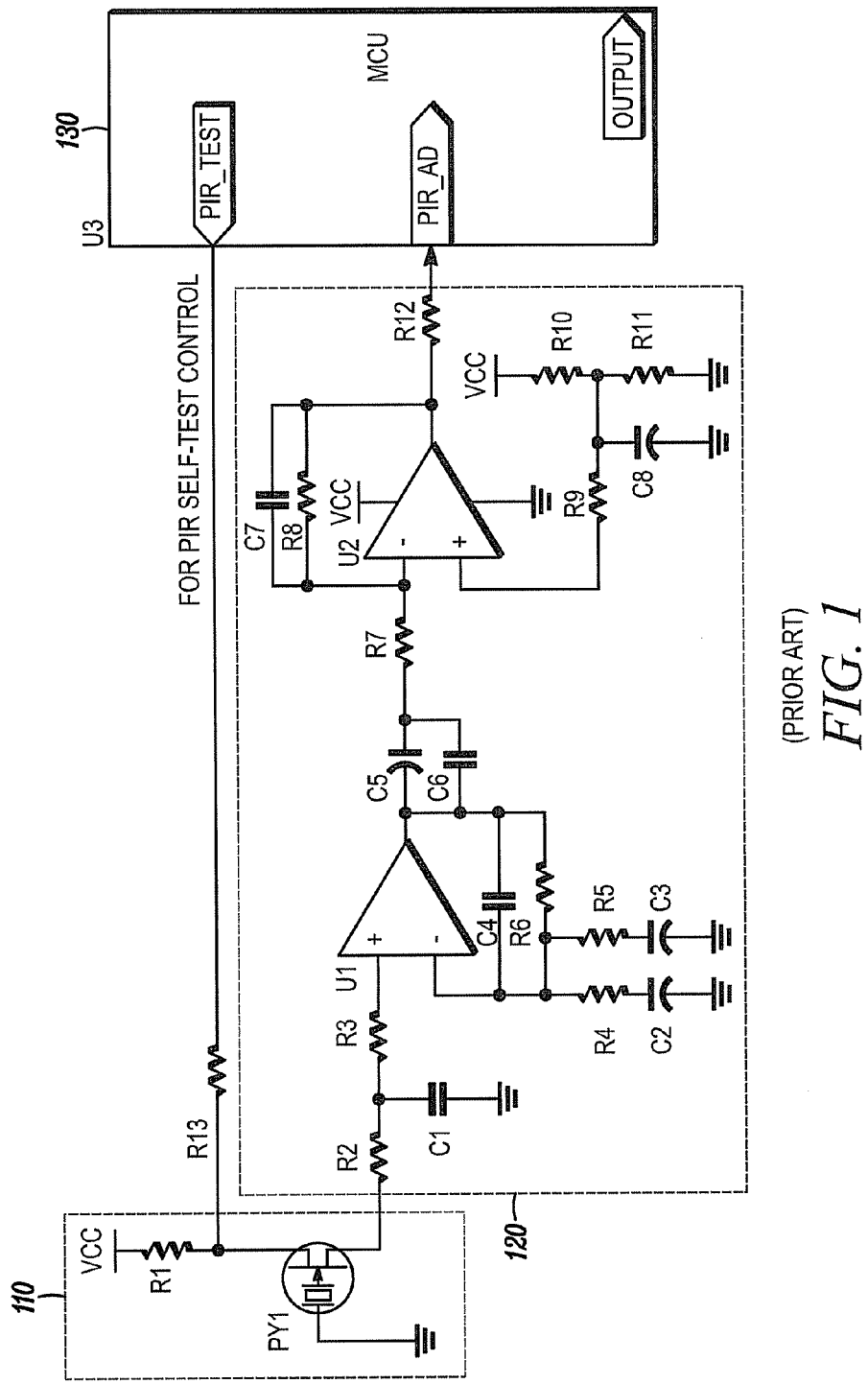
FIG. 1 is a block diagram of a prior art detector.
Figure 2:
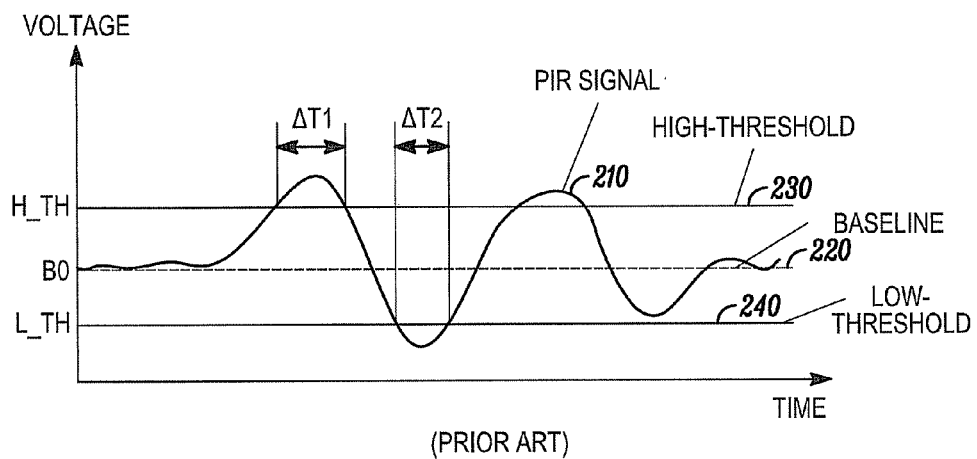
FIG. 2 is a graph illustrating PIR output signal variations over time.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Apparatus and methods in accordance herewith are more effective in making alarm determinations in the presence of smaller sensor output signals than prior art processing. Additionally, false alarms are eliminated to a greater extent than in known PIR-type detectors. In embodiments disclosed herein, energy associated with an incoming PIR signal is evaluated. Results of that evaluation are used to make an alarm determination.

Figure 3:
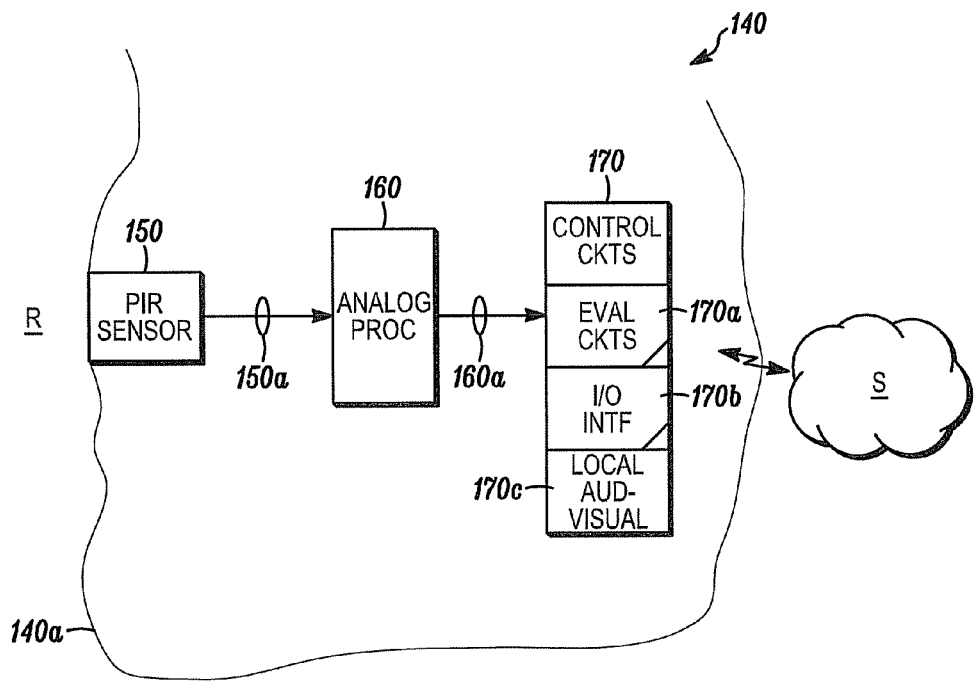
FIG. 3 is a block diagram of a detector in accordance herewith.

FIG. 3 is a block diagram of a detector, or, apparatus 140 in accordance herewith. Detector 140 includes a housing 140a which carries a PIR-type sensor 150 physically configured to monitor an adjacent, external, region R. Output signals from the sensor 150, via line 150a are coupled to analog shaping/amplifying processing signals 160.

Processed analog signals, via line 160a are coupled to control/processing circuits 170. Circuits 170 can be implemented, in part, by one or more of analog input circuitry coupled to an analog-to-digital converter, in combination with analog or digital circuitry to evaluate an energy parameter of the received signals from the sensor 150.

The evaluating circuitry 170a can be implemented with analog circuits (including operational amplifiers), digital signal processors, or general purpose programmable processors all without limitation. In response to the presence of an alarm signal, from the circuitry 170a, output circuitry 170b can produce a local alarm indicating audible or visual signal, via device(s) 170c. Additionally, an alarm indicating signal can be transmitted, via a wired or wireless medium, to one or more displaced monitoring systems S.

Figure 4:
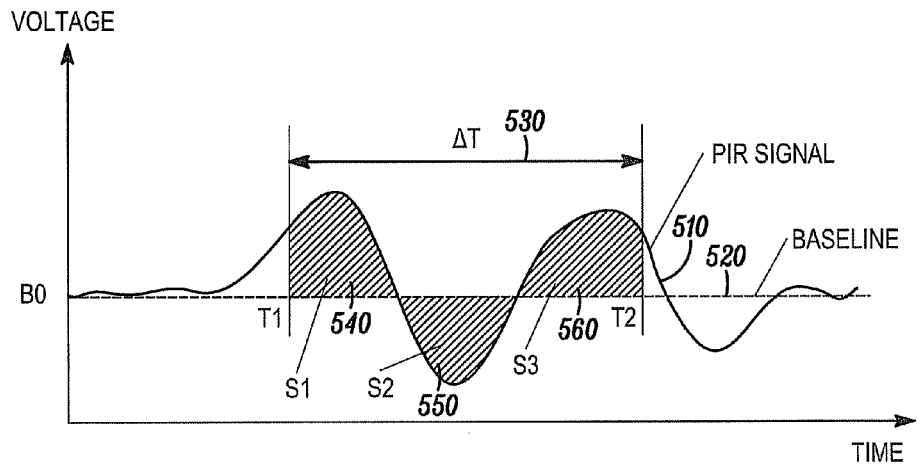
FIG. 4 illustrates aspects of a method in accordance herewith.

FIG. 4 illustrates aspects of alarm determination processing which can be carried out via the evaluating circuitry 170a in response to received sensor signals 510, on line 160a. A signal baseline 520, a sample interval, or, control time 530, and various areas S1 540, S2 550, S3 560 are illustrated. In addition, a threshold S_TH can be pre-established and used to determine whether there an alarm signal should be generated.

The signal baseline 520 is the reference of PIR signal. In a static state, the detecting signal 510 has a value that is close or same as this baseline signal. The sample interval 530 is a time interval, preset according to a specific application, for controlling the sensitivity of the alarm trigger.

The various areas S1 540, S2 550, S3 560, of signal 510, and, the number of such regions are determined by the characteristics of the signal (within the sample time $\Delta T$ 530). The physical significance of an area is that it corresponds to an amount of energy received during the sample interval. Hence, the received PIR signal 510 can be analyzed based on the amount of received energy associated with the signal.

Based on the energy in the signal 510, represented by the areas S1 . . . S3, various signal processing methods can be used to determine if an alarm should be generated.

One form of processing corresponds to digital integration of the signal 510 during the sample interval 530.

Figure 5:
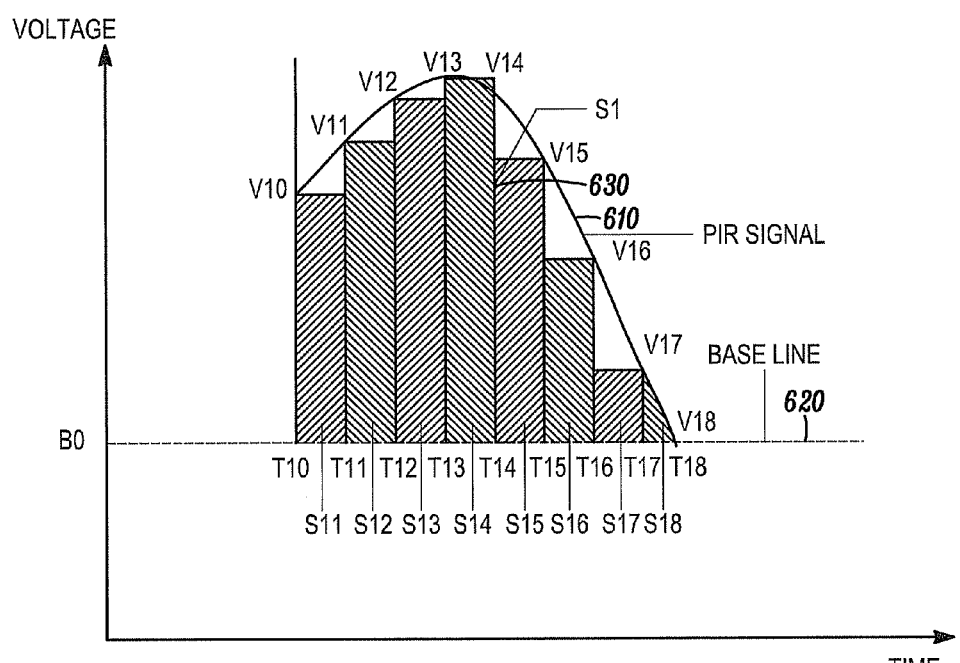
FIG. 5 illustrates additional aspects of the method of FIG. 4.

In a preset time $\Delta T$, calculate S=|S1|+|S2|+|S3|+ . . . if S>S_TH, then the PIR energy is enough to meet the alarm trigger conditions, wherein the S_TH is the area threshold preset, which controls the sensitivity of the alarm trigger. An example is used to illustrate how to use this "digital integration" method to calculate the area S1 (shown in FIG. 4). The method is shown in FIG. 5, wherein the region S1 is divided into 8 parts (smaller rectangles), the associated time interval is $\Delta T1$, signal baseline is B0, and the calculating process is as follows:

The area of S1 is: $S1=|S11|+|S12|+|S13|+|S14|+|S15|+|S16|+|S17|+|S18|$

Wherein:

The area of S11 is: $S11=(T11-T10)\times[(V10+V11)\div 2-B0]=\Delta T1\times[(V10+V11)\div 2-B0]$ The area of S12 is: $S12=\Delta T1\times[(V12+V11)\div 2-B0]$ The area of S13 is: $S13=\Delta T1\times[(V13+V12)\div 2-B0]$ The area of S14 is: $S14=\Delta T1\times[(V14+V13)\div 2-B0]$ The area of S15 is: $S15=\Delta T1\times[(V15+V14)\div 2-B0]$ The area of S16 is: $S16=\Delta T1\times[(V16+V15)\div 2-B0]$ The area of S17 is: $S17=\Delta T1\times[(V17+V16)\div 2-B0]$ The area of S18 is: $S18=\Delta T1\times[(V18+V17)\div 2-B0]$ Then, $$S1 = |S11| + |S12| + |S13| + |S14| + |S15| + |S16| + |S17| + |S18|$$

$$= \Delta T1 \times \begin{bmatrix} (V10+V18)\div 2 + V11 + V12 + V13 + \\ V14 + V15 + V16 + V17 - 8B0 \end{bmatrix}$$

So,
The first block area is:

$$S1 = \sum_{i=1}^{8} |S1i|$$

The total of area is:

$$S = \sum_{k=1}^{n} |Sk|$$

$$= \sum_{k=1}^{n} \sum_{i=1}^{m} |Ski|$$

Wherein the "n" is the number of all area blocks in the time $\Delta T$, and the "m" is number of parts of each area block divided, which is decided by the size of different area block.

In summary, the above process can be applied to each of the regions S2, S3. The indicia of energy associated with each of the regions can then be summed. The result can be compared to the pre-determined threshold S_TH to determine if an alarm should be generated.

Alternately, an amplitude oriented method can be used. In this regard, in a preset time interval $\Delta T$, calculate V=|S1|+|S2|+|S3|+ . . . If V>V_TH, then the PIR energy is enough to meet the alarm trigger conditions, wherein the V_TH is the voltage threshold preset, which controls the sensitivity of the alarm trigger. FIG. 5 illustrates the method. A plurality of differences can be established.

$\Delta V11=V11-B0, \Delta V12=V12-B0, \Delta V13=V13-B0, \Delta V14=V14-B0,$ $\Delta V15=V15-B0, \Delta V16=V16-B0, \Delta V17=V17-B0, \Delta V18=V18-B0.$ Then, $\Delta V1=|\Delta V11|+|\Delta V12|+|\Delta V13|+\Delta V14|+|\Delta V15|+|\Delta V16|+|\Delta V17|+|\Delta V18|$ $\Delta V1=(V11+V12+V13+V14+V15+V16+V17+V18)-8B0.$ So,
The first part accumulation of voltage differences is:

$$\Delta V1 = \sum_{i=1}^{8} |\Delta V1i|$$

The total accumulation of voltage differences for all segments, such as S1 . . . S3, is:

$$V = \sum_{k=1}^{n} |\Delta Vk|$$

$$= \sum_{k=1}^{n} \sum_{i=1}^{m} |Vki|$$

Wherein the "n" is the number of all parts (including the difference that voltage is above or below the baseline) in the time $\Delta T$, and the "m" is the number of the difference of each part, which is decided by the size of different part. This result can be compared to a predetermined alarm threshold to make an alarm determination.

Figure 6:
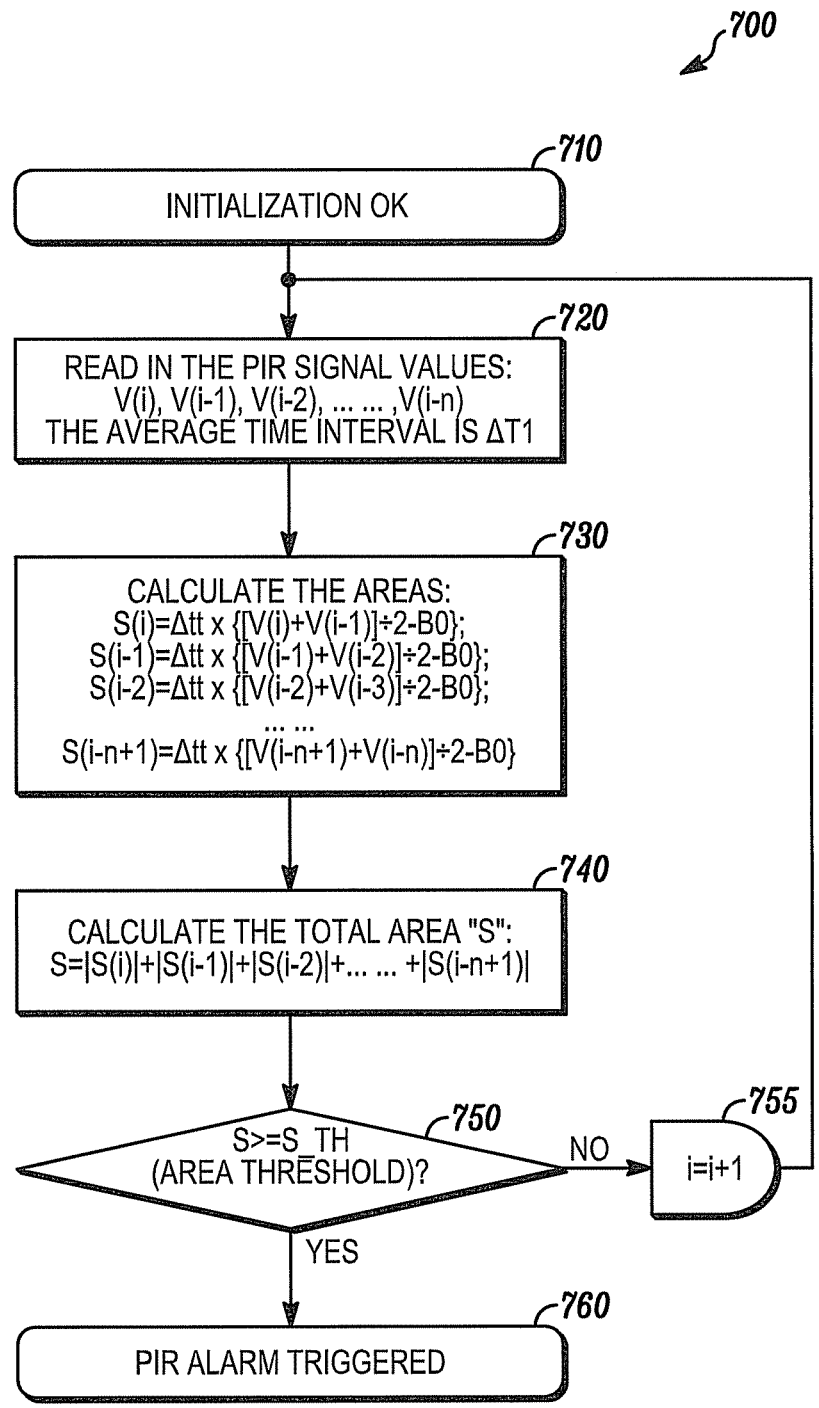
FIG. 6 a flow diagram of a processing method in accordance herewith.
Figure 7:
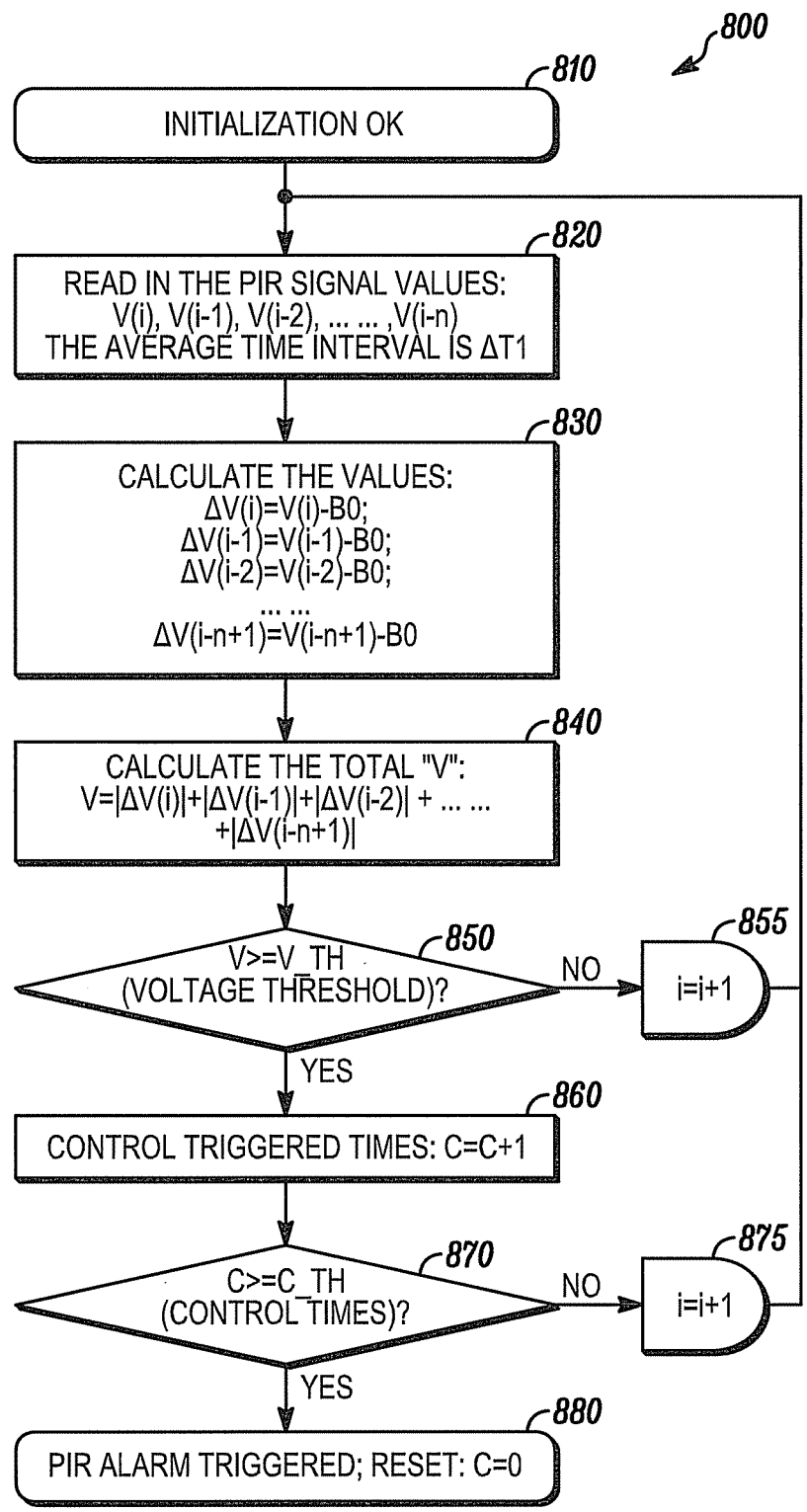
FIG. 7 a flow diagram of an alternate processing method in accordance herewith.

FIGS. 6, 7 illustrate additional aspects of the above described processing. With respect to the flow diagram of process 700, FIG. 6, a detector can be initialized as at 710. The PIR signal values over the sample interval 530 can be acquired as at 720. The areas, such as S1 . . . S3 can be established, as described above, as at 730. The total area associated with the curve 510 can be determined as at 740. A determination can be made as to whether the sum exceeded the predetermined alarm threshold, as at 750. If so, an alarm can be triggered, as at 760. Otherwise, the next sample can be identified, as at 755.

FIG. 7, illustrates processing 800 which relates to the alternate "voltage accumulation" method discussed above. A detector can be initialized as at 810. The values of the respective sensor output signals, such as 510, can be acquired during the sample interval 530, as at 820.

The difference values can then be determined, as at 830. A total energy related parameter value can be determined as at 840. A comparison can be made with the pre-determined alarm threshold, as at 850. If not, the next sample can be defined to be acquired, as at 855. Alternately, as at 860, a times triggered count can be incremented. The total times an alarm condition has been indicated is compared to a threshold, as at 870. If exceeded, an alarm can be triggered, as at 880. Otherwise the next sample can be defined and acquired, as at 875.

Those of skill will understand that the above disclosure is exemplary only. Different numbers of sample points, or sample intervals all come within the spirit and scope hereof.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A motion detector comprising:
an infrared sensor, the sensor having a field of view and an output port and generating a signal at the output port; and
circuitry to receive and to process the signal to establish, during each of a plurality of time intervals, a respective energy parameter value, associated with the signal present during the entirety of the respective time interval, and where each respective energy parameter value is compared to a previously determined first threshold.

2. A detector as in claim 1 which includes circuitry to carry out one of an analog signal processing function, or, a digital signal processing function.

3. A detector as in claim 2 where at least some of the circuitry to receive and to process the signal to establish an energy parameter value associated with the signal, a circuitry to detect if the processed signal indicates that a moving body has been sensed in the field of view, and the circuitry to carry out one of an analog signal processing function or a digital signal processing function is selected from a class which includes at least operational amplifiers, digital signal processors, and programmable general purpose processors.

4. A detector as in claim 1 where at least some of the circuitry to receive and to process the signal to establish an energy parameter value associated with the signal and a circuitry to detect if the processed signal indicates that a moving body has been sensed in the field of view is selected from a class which includes at least operational amplifiers, digital signal processors, and programmable general purpose processors.

5. A detector as in claim 1 where the circuitry increments a count when the respective parameter value equals or exceeds the first threshold.

6. A detector as in claim 5 where the circuitry compares the count to a second previously determined second threshold, and where the count at least equals the second threshold, the circuitry generates an alarm indicator.

7. A detector as in claim 6 where the alarm indicator is at least one of, emitted locally, or, transmitted to a displaced location.

8. A detector as in claim 6 where the count is reset to zero when the alarm indicator is generated.

9. A method of monitoring a region comprising:
establishing a current sample time interval;
during the current sample time interval obtaining a movement related signal from a region being monitored;
evaluating energy related characteristics of the signal during the entire current sample time interval and establishing a signal energy parameter value for the entire current sample time interval and comparing that value to a first predetermined threshold and if equal or greater, incrementing a count of times triggered and then returning to establishing.

10. A method as in claim 9 which includes comparing the count to a predetermined second threshold, and if equal to or greater, generating an alarm indicia.

11. A method as in claim 10 which includes resetting the count to zero before returning to establishing.

12. A method as in claim 9 where establishing includes establishing a plurality of substantially equal sample time intervals.

* * * * *